United States Patent [19]

Malki et al.

[11] 4,310,498

[45] Jan. 12, 1982

[54] TEMPERATURE CONTROL FOR DRY SO$_2$ SCRUBBING SYSTEM

[75] Inventors: Khaldoun W. Malki; Edward J. Angelini, both of Birmingham, Ala.

[73] Assignee: Combustion Engineering, Inc., Windsor, Conn.

[21] Appl. No.: 143,201

[22] Filed: Apr. 24, 1980

[51] Int. Cl.$^3$ .............................................. C01B 17/00
[52] U.S. Cl. ................................... 423/242; 23/230 A
[58] Field of Search .......... 423/242 A, 242 R, 244 A, 423/244 R; 23/230 A

[56] References Cited

U.S. PATENT DOCUMENTS 2,862,789 12/1958 Burgess ................................ 423/242
4,208,381 6/1980 Ishaya et al. ..................... 423/242 X
4,208,383 6/1980 Kisters et al. .................... 423/242 X

*Primary Examiner*—O. R. Vertiz
*Assistant Examiner*—Gregory A. Heller
*Attorney, Agent, or Firm*—William W. Habelt

[57] ABSTRACT

The temperature of the flue gas entering a spray dryer SO$_2$ absorption chamber (26) is increased so as to maintain the temperature of the flue gas leaving the spray dryer SO$_2$ absorption chamber (26) at a preselected temperature above the adiabatic saturation temperature of the flue gas so as to permit greater amounts of sulfur oxide absorbent slurry (36) to be sprayed into the flue gas, thereby allowing the treatment of flue gas containing high levels of sulfur oxide.

2 Claims, 1 Drawing Figure

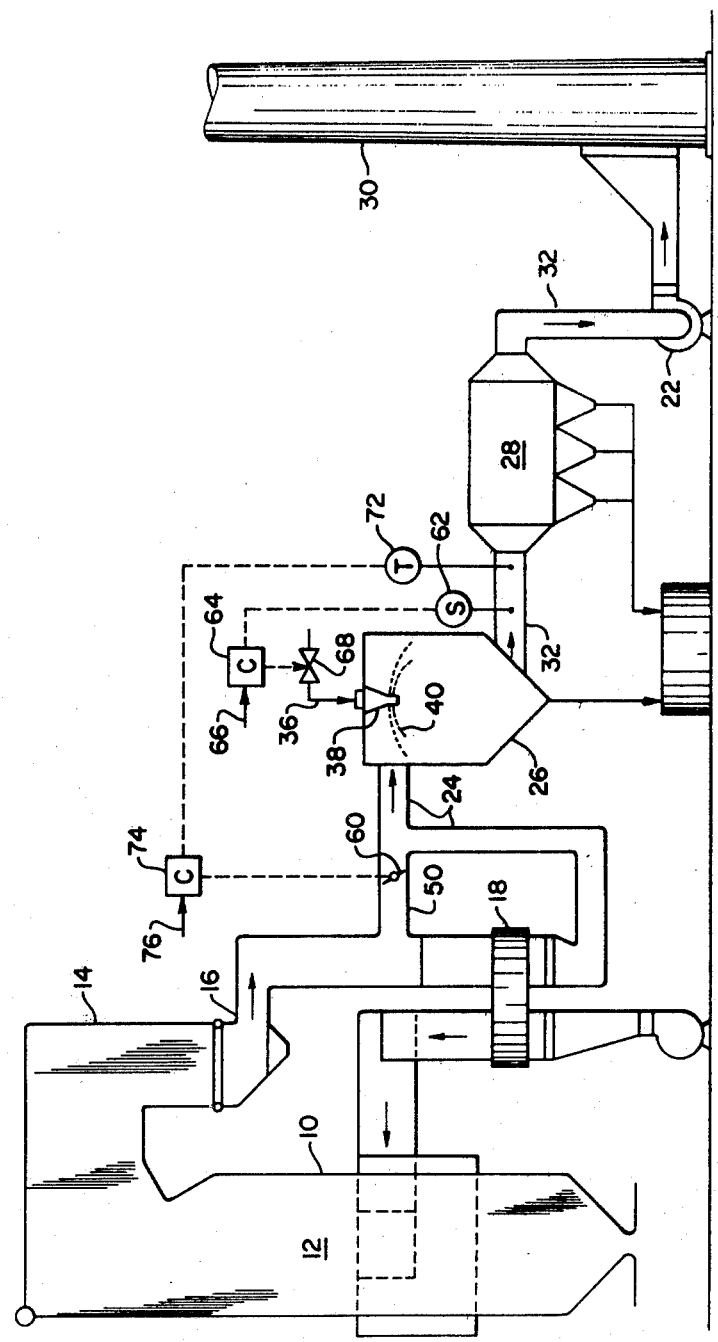

TEMPERATURE CONTROL FOR DRY SO$_2$ SCRUBBING SYSTEM

BACKGROUND OF THE INVENTION

The present invention relates to an apparatus and method for removing sulfur oxides from a flue gas produced during the combustion of a sulfur bearing fossil fuel. More particularly, it relates to an apparatus and method for controlling the temperature of the flue gas entering a spray dryer absorption chamber in order to permit greater amounts of sulfur oxide absorbent slurry to be sprayed into flue gas thereby allowing the treatment of flue gas containing high levels of sulfur oxide and insuring higher sulfur removal efficiencies.

Sulfur oxides are produced during the combustion of sulfur bearing fossil fuels, such as oil and coal. The adverse effect on the environment of discharging such sulfur oxide into the atmosphere is well established and has led to legislation greatly restricting the amount of sulfur oxide which may be emitted to the atmosphere from fossil fuel burning sources, particularly from coal fired power plants. As a result of such legislation, research and development efforts have centered on providing SO$_2$ removal systems which can efficiently remove sulfur oxide form the flue gases of sources firing sulfur bearing fossil fuels, particularly high sulfur coals which are readily abundant in the U.S. One such promising system is commonly referred to as a dry SO$_2$ scrubbing system.

A typical dry SO$_2$ scrubbing system of the type designed for use on a fossil fuel fired power plant employs a spray dryer absorption chamber and a dry particulate collector disposed in series downstream of an air heater. In operation of such a system, the sulfur oxide bearing flue gases generated within the combustion chamber of the steam generator are first passed through an air heater in indirect heat exchange relationship with the incoming combustion air in order to extract heat from the flue gas to heat the incoming combustion air and thereby increase combustion efficiency. The flue gas leaving the air heater then passes through the spray dryer absorption chamber wherein a spray of sulfur oxide absorbent slurry contacts the flue gas and reacts with the sulfur oxides in the flue gas so that a major portion of the sulfur oxides are absorbed therefrom in the form of a dry particulate sulfur compound. The flue gas leaving the spray dryer absorption chamber is then passed through a dry particulate collector, such as an electrostatic precipitator, a cyclone separator or a bag filter, wherein the dry particulate sulfur compound and any other particulate matter, such as fly ash and unreacted sulfur oxide absorbent particles, are collected before the flue gas is released to the atmosphere.

In such a system, it is desirable that the temperature of a flue gas leaving the spray dryer absorption chamber be maintained above a preselected minimum temperature, specifically above the adiabatic saturation temperature of the flue gas, in order to insure that only dry particulate matter is entrained in the flue gas stream entering the downstream particulate collector. A known method of maintaining the flue gas temperature leaving the spray dryer absorption chamber above the adiabatic saturation temperature comprises adjusting the liquid feed rate to the sulfur oxide absorbent slurry sprayed into the spray dryer absorption chamber. The sensible heat in the flue gas entering the spray dryer absorption chamber is used to vaporize the liquid in the sulfur oxide absorbent slurry to produce a dry powder before the flue gas leaves the spray dryer absorption chamber. By varying the liquid feed rate, the amount of heat removed from the flue gas in vaporizing the liquid in the slurry as the flue gas traverses the spray dryer absorption chamber is also varied. Accordingly, for a given flue gas temperature entering the spray dryer absorption chamber, the temperature of the flue gas leaving the spray dryer absorption chamber can be adjusted by varying the liquid feed rate in order to prevent complete saturation of the flue gas thereby maintaining the temperature of the flue gas leaving the spray dryer absorption chamber above the adiabatic saturation temperature.

One problem associated with the above described method of controlling the temperature of the flue gas leaving the spray dryer absorption chamber arises when the flue gas to be cleaned has a high sulfur oxide content such as is typically the case when a high sulfur coal is combusted in a steam generating power plant. In such a case, the amount of sulfur oxide absorbent mixed with the liquid to form the sulfur oxide absorbent slurry must be increased in order to provide sufficient sulfur oxide absorbent surface to insure that efficient sulfur oxide removal is obtained as the flue gas traverses the spray dryer absorption chamber.

It is known that at high concentrations of sulfur oxide absorbent solids in the absorbent slurry, the slurry cannot be handled effectively from a fluid dynamic standpoint. That is, problems are encountered with the plugging of the spray nozzle, with slurry flowability, and with absorbent slaking. When high sulfur oxide content flue gas is to be cleaned in such a spray dryer absorption chamber, the liquid feed rate to the slurry must be increased in order to accommodate the higher level of sulfur oxide absorbent solids being added to the slurry. Consequently, a greater amount of liquid must be vaporized by the flue gas therefore the flue gas temperature leaving the spray dryer absorption chamber will drop. Thus control and optimization of the flue gas temperature leaving the spray dryer absorption chamber can no longer be obtained by varying the liquid feed rate.

SUMMARY OF THE INVENTION

It is an object of the present invention to maintain the flue gas temperature leaving the spray dryer absorption chamber of a dry sulfur oxide scrubbing system above the adiabatic saturation temperature independently of the liquid feed rate to the absorbent slurry.

In accordance with the present invention, the temperature of the flue gas entering the spray dryer absorption chamber is increased so as to maintain the temperature of the flue gas leaving the spray dryer absorption chamber at a preselected temperature above the adiabatic saturation temperature of the flue gas so as to permit greater amounts of sulfur oxide absorbent slurry to be sprayed into the flue gas, thereby allowing the treatment of the flue gas containing high levels of sulfur oxide and insuring higher sulfur oxide removal efficiencies. In the preferred embodiment of the present invention, the flue gas temperature entering the spray dryer absorption chamber is increased by bypassing a portion of the flue gas around the air heater and remixing said bypass portion with the remainder of the flue gas at a location between the air heater and the spray dryer absorption chamber. The preferred means for accomplishing this include a bypass duct for providing a flow passageway from a point upstream with respect to flue gas flow of the air heater to a location intermediate between the air heater and the spray dryer absorption chamber, and a damper positioned in the bypass duct for controlling the flow of flue gas therethrough in order to maintain the temperature of the flue gas leaving the spray dryer absorption chamber at a preselected temperature above the adiabatic saturation temperature of the flue gas.

BRIEF DESCRIPTION OF THE DRAWING

The sole FIGURE of the drawing illustrates, in diagrammatic form, a fossil fuel fired power plant including a dry $SO_2$ scrubbing system designed in accordance with the present invention.

DESCRIPTION OF THE PREFERRED EMBODIMENT

Referring now to the drawing, there is depicted a fossil fuel fired power plant having a steam generator 10 wherein a sulfur bearing fossil fuel, such as oil or coal, is combusted with air in a furnace chamber 12 to form combustion products termed flue gas. The hot flue gas, including sulfur oxide gases generated during the combustion of the sulfur bearing fuel within the furnace 12, exit from the furnace 12 through convection bank gas pass 14. The hot flue gas traversing convection bank 14 passes over various heat exchange surface immersed therein in heat exchange relationship with a liquid such as water flowing through the heat exchange surface to generate steam. In a typical coal or oil fired steam generator, the flue gas would leave convection bank gas pass 14 through outlet duct 16 to an air heater 18 at a temperature in the range of 300 to 450 C.

As the flue gas passes through air heater 18 in indirect heat exchange relationship with combustion air being conveyed to the furnace, the flue gas is further cooled to a temperature typically in the range of 100 to 200 C. From the air heater, the flue gas passes through duct 24 to one or more spray dryer absorption chambers 26. Having traversed the spray dryer absorption chambers 26, the flue gases are conveyed through a dry particulate collector 28 to a stack 30 for venting to the atmosphere with duct 32 being provided to convey the flue gas from the outlet of the absorption chamber 26 through the dry collector 28 to the stack 30. An induced draft fan 22 is located in duct 32 to draw the flue gases to the stack 30.

As the flue gas passes through the spray dryer absorption chambers 26, it contacts a mist-like spray 40 of sulfur oxide absorbent slurry 36. The sulfur oxide absorbent within the slurry reacts with the sulfur oxide in the flue gas so that a major portion of the sulfur oxides are absorbed therefrom in the form of dry particulate sulfur compounds, typically sulfite or sulfate powders. While the sulfur oxide absorbent is reacting with the $SO_2$ within the gas, the liquid portion of the slurry used to carry the sulfur oxide absorbent is vaporized by the sensible heat in the flue gas so that only dry particulates remain within the flue gas. In this process, of course, the temperature of the flue gas is lowered as it passes through the spray dryer absorption chamber 26.

In the typical dry scrubbing systems of the prior art, the flue gas temperature leaving the spray dryer absorption chamber 26 was maintained above the adiabatic saturation temperature by varying the slurry feed rate to the spray dryer absorption chambers 26. That is, if the flue gas temperature leaving the spray dryer absorption chamber 26 became too low the rate of slurry feed to the spray dryer absorption chambers would be reduced. Consequently, less evaporation of slurry liquid would occur within the spray dryer absorption chambers thus the temperature of the flue gas leaving the spray dryer absorption chamber would increase.

Additionally, it is common practice in the dry scrubbing systems of the prior art to control the concentration of sulfur absorbent within the slurry in response to the $SO_2$ level in the flue gas leaving the spray dryer absorption chamber 26 or in the stack 30. Consequently, a problem would arise when firing a high sulfur coal in the furnace chamber 12 of the steam generator 10. Specifically, the high sulfur level in the coal would mandate that increased amounts of sulfur oxide absorbent be added to the slurry 36 being fed to the spray dryer absorption chambers 26. In order to maintain the solids concentration within the slurry at low enough levels, it was also necessary to increase the liquid feed to the slurry. This of course resulted in more evaporation occurring within the spray dryer absorption chambers 26. As a result of this increased evaporation within chambers 26, too much heat would be removed from the flue gases passing therethrough thus resulting in too low of a flue gas temperature leaving chambers 26. In response to this low gas temperature, the control system of typical prior art dry scrubber would react to decrease the amount of liquid feed to the slurry in order to reduce the amount of evaporation required within the spray dryer absorption chamber 26. Unfortunately, this would typically result in the solids concentration within the slurry increasing to unacceptably high concentrations which would hinder operation by plugging the spray nozzles and hindering slurry flowability.

The method and apparatus of the present invention permits the flue gas temperature leaving the spray dryer absorption chamber 26 to be maintained above the adiabatic saturation temperature independently of either the overall slurry feed rate or the feed rate of liquid to the slurry. In the present invention, a slurry 36 of sulfur oxide absorbent particles, such as lime, limestone or soda ash, is injected into the spray dryer absorption chamber 26 as a fine mist 40 through spray nozzle atomizers 38. As in the prior art, the flue gas passing through the spray dryer absorption chamber 26 contacts the sulfur oxide absorbent which reacts with the sulfur oxide in the flue gas to remove a major portion of the sulfur oxide therefrom as a particulate sulfur compound, typically a sulfite or a sulfate. As before, the heat within the flue gas passing through the spray dryer absorption chamber 26 evaporates the water within the slurry 36 such that only dry particulates remain in the flue gas leaving the spray dryer absorption chamber 26.

In accordance with the present invention, means are provided for increasing the temperature of the flue gas entering the spray dryer absorption chamber so as to maintain the temperature of the flue gas leaving the spray dryer absorption chamber at a preselected temperature level above the adiabatic saturation temperature of the flue gas. This enables greater amounts of sulfur oxide absorbent slurry to be sprayed into the flue gas thereby allowing the treatment of flue gas containing high levels of sulfur oxide and allowing higher sulfur oxide removal efficiencies. Although such means could comprise any number of heating devices such as a steam coil disposed in duct 24 at the inlet of the spray dryer absorption chamber 26 or even a small independently fired burner disposed in duct 24 to heat the flue gas entering the spray dryer absorption chambers 26, it is preferred to provide means for bypassing a portion of the flue gas around the air heater and remixing the bypassed portion of the flue gas with the remainder of the flue gas at a location between the air heater and the spray dryer absorption chamber.

In the preferred embodiment of the present invention shown in FIGURE, the means for increasing the temperature of the flue gas entering the spray dryer absorption chamber 26 comprises a bypass duct 50 for providing a flow passageway from a location upstream with respect to flue gas flow of the air preheater 18 to a location in duct 24 intermediate between the air preheater 18 and the spray dryer absorption chamber 26, and a damper 60 positioned in the bypass duct 50 for controlling the flow of the flue gas therethrough. As induced draft fan 22 is provided at a point downstream of the intersection of the bypass duct 50 with duct 24 to draw the flue gas through both ducts 50 and 24 when damper 60 is open.

In operation, flue gas damper 60 opens to allow a portion of the hot flue gas leaving the steam generator 10 through outlet duct 16 to bypass the air heater 18 and enter duct 24 at a location upstream of the inlet to the spray dryer absorption chamber 26. The remainding portion of the flue gas continues to flow through on its normal path through the air preheater 18. These two flowstreams rejoin at a point downstream of the air preheater 18 but upstream of the spray absorption chamber 26. Since the bypassed portion remains hot, the temperature of the flue gas entering the spray dryer absorption chamber 26, i.e. the remixed gas, is increased above that temperature which would have existed if all the flue gases had passed through the air preheater 18.

In accordance with the present invention, a sulfur oxide monitoring device 62 and a temperature sensing device 72 are positioned in duct 32 downstream of the outlet to the spray dryer absorption chamber 26. The sulfur oxide monitoring device 62 sends a signal to controller 64 wherein this signal is compared to a set point signal 66, which in this case would represent a preselected sulfur oxide emission level known to be below that required by local air pollution regulations. A resultant signal indicating whether the monitored sulfur oxide level in the flue gas is above or below the set point is emitted from the controller 66 and passed to control valve 68 which increases the feed rate of sulfur oxide absorbent slurry 36 to the spray dryer absorption chamber 26 whenever the monitored sulfur oxide emission level is above the set point emission level.

Simultaneously and independently, the temperature of the flue gas entering the spray dryer absorption chamber 26 is increased by bypassing hot flue gas around the air heater 18 through duct 50 in response to a signal from controller 74. In accordance with the invention, temperature sensing device 72, positioned in duct 32 at a location downstream with respect to flue gas flow of the outlet spray dryer absorption chamber 26, sends a signal to controller 74 wherein this signal is compared to a set point signal 76, which in this case would represent a preselected temperature known to be above the adiabatic saturation temperature of the flue gas and preferably at least 50° F. above the adiabatic saturation temperature of the flue gas. A resultant signal indicating whether the sensed temperature is above or below the set point is emitted from the controller 74 and passed to a suitable servo-mechanism associated with damper 60 which opens damper 60 to permit flue gas flow through duct 50 into duct 24 in order to increase the flue gas temperature entering the spray dryer absorption chamber 26. In this manner, the flue gas temperature leaving the spray dryer absorption chamber 26 is maintained above the adiabatic saturation temperature of the flue gases independently of the sulfur oxide slurry feed rate or liquid feed rate to the sulfur oxide absorbent slurry. By maintaining the flue gas temperature leaving the spray dryer absorption chamber 26 above the adiabatic saturation temperature, it is insured that only dry particulate matter will be present in the flue gas leaving the spray dryer absorption chamber 26. This will insure efficient removal and collection of the dry particulate matter present in the flue gas as the flue gas passes through the dry particulate collector 28 which may be an electrostatic precipitator, a cyclone collector or a bag filter.

From the above, it can be seen that a simple and efficient apparatus and method has been provided for maintaining the flue gas temperature leaving the spray dryer absorption chamber above that necessary to insure efficient operation of the dry scrubbing system on even high sulfur coals. The temperature of the flue gas leaving the spray dryer absorption chamber 26 is controlled completely independently of the liquid feed rate to the sulfur oxide absorbent slurry itself. The feed rate of the sulfur oxide absorbent slurry can therefore be increased to insure efficient removal of the high level of sulfur oxides that would be present in a flue gas produced from the combustion of a high sulfur coal without having to be concerned with the concentration of solids in the slurry becoming excessive as one can now increase the liquid feed rate to the slurry in order to control the solids concentration without having to be concerned with the flue gas temperature leaving the spray dryer absorption chamber 26 becoming too low.

While the preferred embodiment of the present invention has been illustrated and described, it is to be understood that the invention should not be limited thereto.

We claim:

1. An improved method for removing sulfur oxides from a flue gas produced during the combustion of a sulfur-bearing fossil fuel of the type wherein the flue gas is progressively passed through an air heater, a spray dryer wherein a spray of sulfur oxide absorbent slurry contacts the flue gas and reacts with the sulfur oxides in the flue gas so that a portion of the sulfur oxides are absorbed therefrom in the form of a dry particulate sulfur compound, and a particulate collector wherein the dry particulate sulfur compound is collected before the flue gas is released to the atmosphere; the improvement comprising the steps of:

a. sensing the sulfur oxide level in the flue gas leaving the spray dryer;
  b. comparing said sensed sulfur oxide level to a preselected emission level;
  c. whenever said sensed sulfur oxide level is greater than the preselected emission level spraying greater amounts of sulfur oxide absorbent slurry into the flue gas passing through said spray dryer so as to cause the sulfur oxide level in the flue gas leaving the spray dryer to drop below the preselected emission level;
  d. sensing the temperature of the flue gas leaving the spray dryer;

e. comparing said sensed temperature to a preselected temperature above the adiabatic saturation temperature of the flue gas; and f. simultaneously with step c. increasing the temperature of the flue gas entering the spray dryer so as to maintain the temperature of the flue gas leaving the spray dryer at said preselected temperature and above the adiabatic saturation temperature of the flue gas said step of increasing the temperature of the flue gas entering the spray dryer comprising bypassing a portion of the flue gas around the air preheater and remixing said bypassed portion with the remainder of the flue gas before passing the remixed flue gases through the spray dryer, the bypassed portion being sufficient to maintain the temperature of the flue gas entering the spray dryer at a temperature sufficient to maintain the temperature of the flue gas leaving the spray dryer at a preselected temperature above the adiabatic saturation temperature of the flue gas.

2. An improved method as recited in claim 1 wherein the preselected temperature at which the flue gas leaving the spray dryer is to be maintained is at least 50 F. above the adiabatic saturation temperature of the flue gas.

* * * * *